United States Patent [19]
Blodee

[11] 3,986,316
[45] Oct. 19, 1976

[54] JOINT ASSEMBLY
[75] Inventor: Leif Blodee, Holland, Mich.
[73] Assignee: The Gunlocke Company, Inc., Wayland, N.Y.
[22] Filed: June 10, 1974
[21] Appl. No.: 477,612

[52] U.S. Cl. .............................. 52/753 D; 403/176; 403/231; 211/189; 248/188.1
[51] Int. Cl.² ........................................... F16B 5/00
[58] Field of Search .......... 403/241, 239, 231, 230, 403/233, 217, 191, 189; 248/188.1; 52/753 D, 753 C; 211/177

[56]  References Cited
UNITED STATES PATENTS

| | | | |
|---|---|---|---|
| 1,241,137 | 9/1917 | Mitchell | 403/191 |
| 3,670,899 | 6/1972 | Kronenberg | 403/231 X |
| 3,873,219 | 3/1975 | Pofferi | 403/219 X |

FOREIGN PATENTS OR APPLICATIONS

| | | | |
|---|---|---|---|
| 163,721 | 6/1955 | Australia | 403/217 |
| 1,470,939 | 1/1967 | France | 403/189 |
| 1,575,281 | 11/1969 | Germany | 403/217 |
| 1,218,512 | 1/1971 | United Kingdom | 403/217 |

Primary Examiner—Wayne L. Shedd
Attorney, Agent, or Firm—Brooks Haidt Haffner & Delahunty

[57] ABSTRACT

In furniture construction a joint is formed between an upright post and the dovetail shaped end of a rail member by the clamping action of a pair of disc-shaped cap members having coaxially slanted interior peripheral portions that mate with the notches of the dovetail rail end. The cap members are mounted on an axially extending rod, and screw threads allow one of the cap members to be rotated into clamping position. A sleeve on the rod and extending between the cap members has vertical ribs for interfitting with vertical grooves in the ends of rail members to prevent overturning of the rail members. In certain embodiments, provision is made for preloading of joint elements. Various arrangements of joined elements make a wide range of furniture assemblies possible.

4 Claims, 15 Drawing Figures

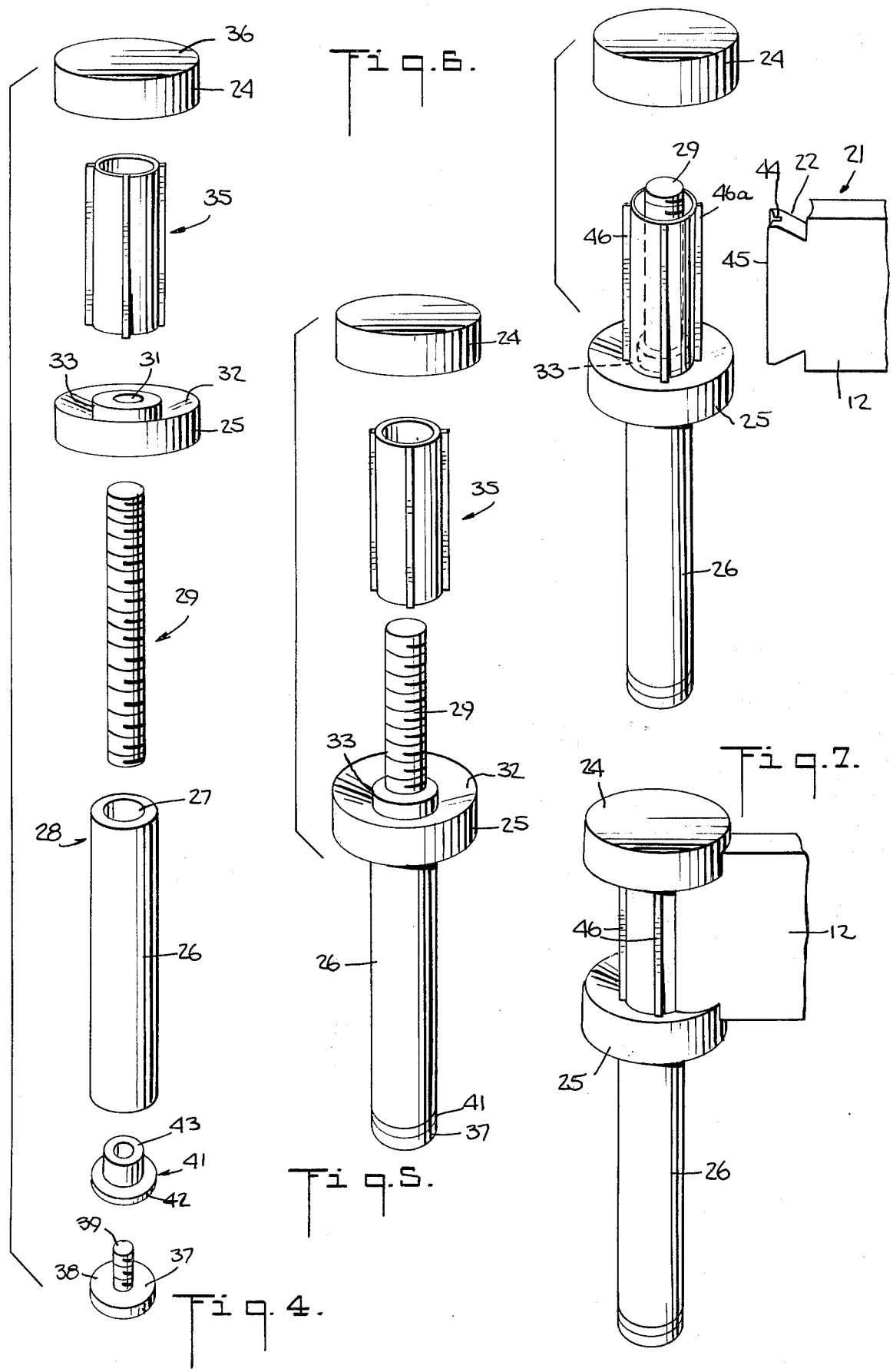

JOINT ASSEMBLY

BACKGROUND OF THE INVENTION

1. Field of the Invention

The present invention relates to joining structural members in furniture construction and more particularly to a right angle post-to-rail joint and furniture assemblies incorporating such joints.

2. Description of the Prior Art

A wide variety of modular furniture is presently available, ranging from kits for do-it-yourself assembly to office and commercial furniture requiring skilled workers for assembly. The manner in which structural parts are interfitted and the arrangements of fasteners vary widely from simple nuts and bolts to complex systems of interrelated elements subject to tension and compression. Many of the basic principles were known and employed by carpenters and joiners for generations before the current demand for modular furniture came into existence.

For example, U.S. Pat. No. 312,731 shows a table designed to be knocked down for shipping or storage that employs cup shaped locking rings to join arms to the legs of the table. A long threaded rod and hand-nut arrangement is shown in this patent for tightening the assembly.

A modern modular room divider arrangement of panels forming a straight wall is illustrated by U.S. Pat. No. 3,517,467 wherein wedging surfaces at the vertical end faces of panels slidably mate with wedging surfaces of blocks between adjacent panels. Panels can be drawn together by drawing the wedging blocks into position by means of a screw arrangement.

U.S. Pat. No. 3,636,893 relates to the assembly of shelves, primarily by the use of opposed channel-shaped caps, the legs of which fit into horizontal grooves of panels. The caps are secured within the ends of supports and are interconnected by bolts and the joints are concealed by the ends of supports within which the caps are mounted. The patent mentions that supports having a round cross-sectional shape could be employed if a very pull-resistant connection is not too important, and that in such an arrangement the connection could be made by turning of the respective supports.

Other arrangments for joining horizontal to vertical structural members are shown by U.S. Pat. Nos. 2,962,415 and 3,747,885.

Despite these and other prior attempts to provide a system for joining parts of modular furniture, there remains a demand for a versatile and attractive yet simple system employing similar joint structures throughout.

SUMMARY OF THE INVENTION

Structural members such as the horizontal rails of tables, the frame members of chairs and panels and the like are connected at right angles to supporting elements such as upright posts in accordance with the present invention by means of pairs of cooperating members mounted on the supporting elements. In a presently preferred embodiment of the invention the cap members are generally disc-shaped and coaxially mounted with respect to an axially extending threaded rod so that by screwing one of the cap members down on the threads of the rod, slanted clamping surfaces of both cap members can be brought into tight engagement with mating slanted surfaces provided at the end of a structural member. Thus, for example, a horizontal wooden rail having a dovetail configuration at each of its ends can be firmly joined to an upright post at each end.

Each pair of cap members can accommodate the ends of several structural members extending radially outward from the post on which the cap members are mounted. For example, each of the four legs of a table or chair can be provided with a pair of the cap members according to the invention and the ends of two lateral rails can then be joined respectively to each leg, thus to support a horizontal surface between four rails. Four, or even six radially extending lateral structural members could be clamped between the pair of cap members on one supporting element or post if desired.

A tubular sleeve extending between the pair of cap members conceals the internal structure where it would otherwise be exposed between the lateral members, and, by providing ribs or splines running lengthwise in the axial direction of the sleeve to fit within grooves in the ends of the lateral members, the joint can be made rigid in the sense that no relative movement can occur.

By using the joint of the invention, which is decorative in itself, there is no need to provide facing elements or other non-functional members to conceal joints. The clamping action of the joints of the invention is direct and effective in providing a permanent condition when desired, as in the construction of furniture, and few, if any, tools are needed for assembly. The versatility of the joints according to the invention means that a limited stock of parts will provide the basic inventory for a wide range of installations.

These and other advantageous features and applications of the joint of the invention and furniture assemblies incorporating such joints will more fully appear from the following detailed description of the invention, especially when that description is read with reference to the accompanying drawing, illustrating preferred embodiments of the invention.

BRIEF DESCRIPTION OF THE DRAWINGS

FIG. 3 is a view in section taken along line 3—3 of FIG. 1 and looking in the direction of the arrows.

FIG. 4 is an exploded view showing elements of a joint according to the invention in disassembled condition.

FIG. 5 shows the elements of FIG. 4 partly assembled.

FIG. 6 shows a further stage in the assembly of the elements of FIGS. 4 and 5 with a rail about to be placed in position.

FIG. 7 shows the completed joint of the elements of FIGS. 4–6 with the rail of FIG. 6 in its final position.

DETAILED DESCRIPTION OF PREFERRED EMBODIMENTS

Figure 1:
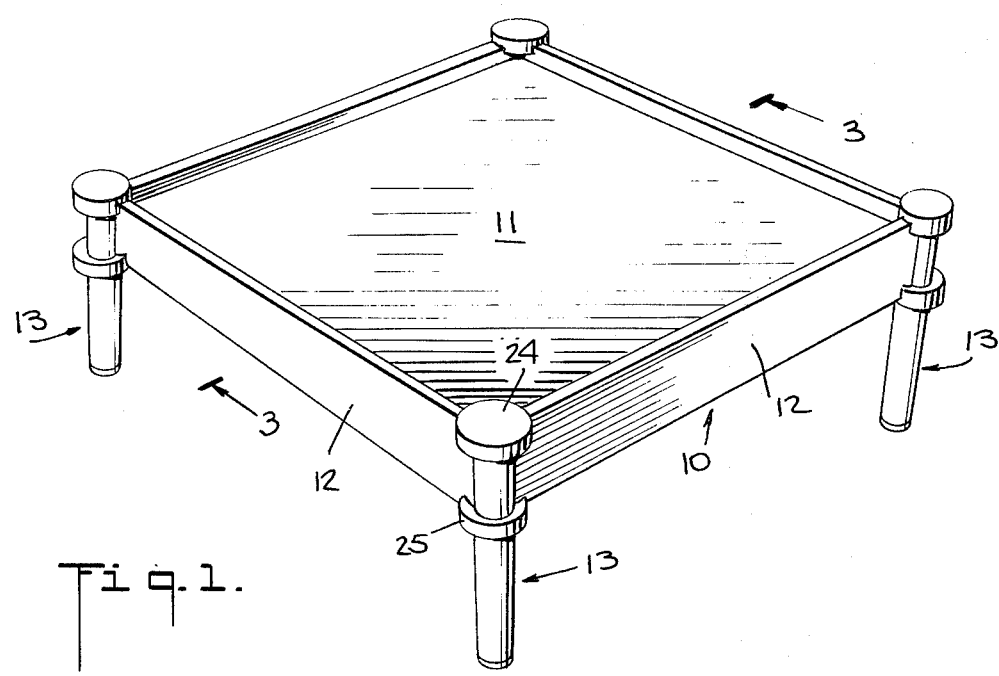
FIG. 1 is a view in perspective of a table or similar article of furniture incorporating joints in accordance with the invention.
Figure 2:
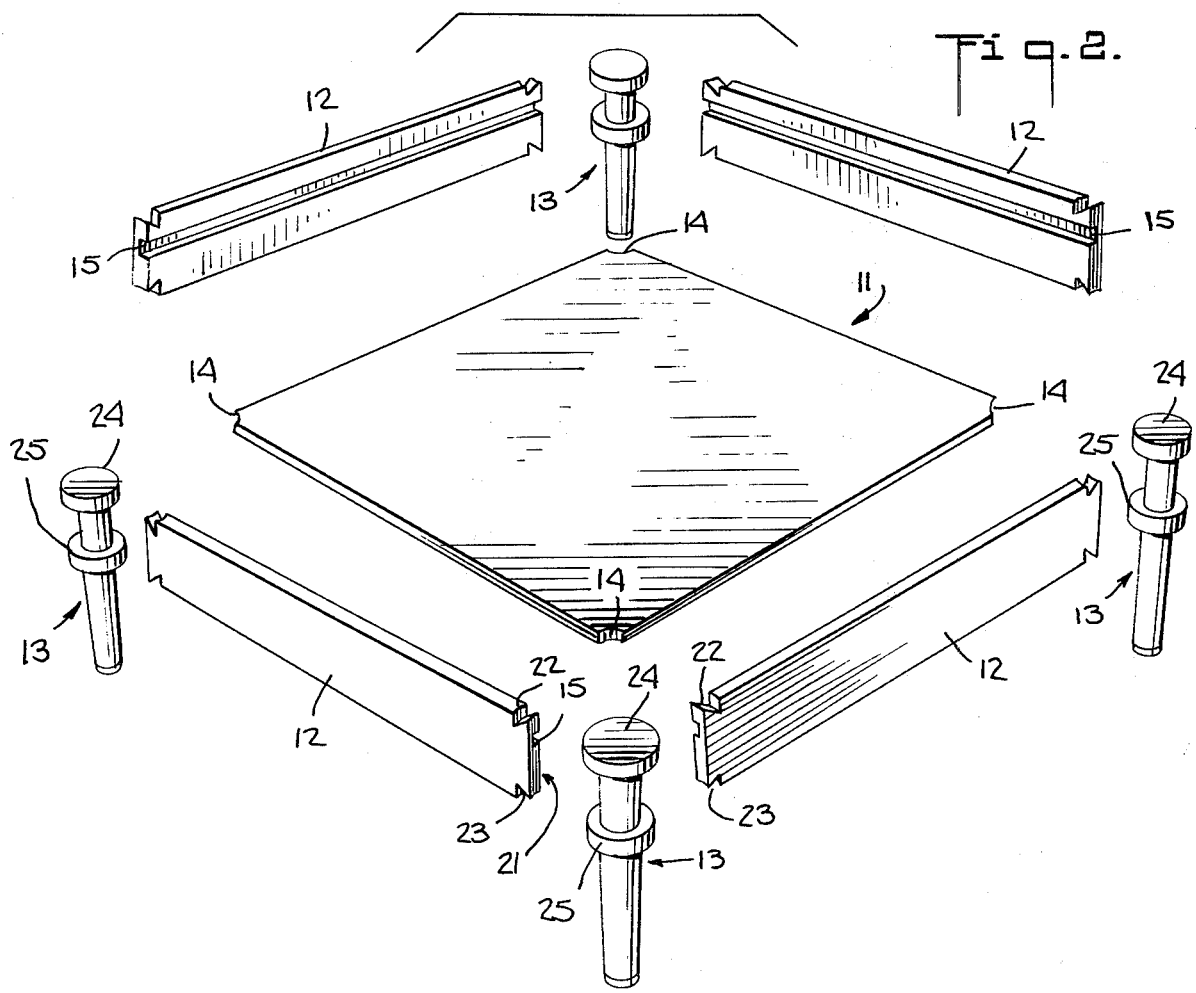
FIG. 2 is an exploded view of the furniture of FIG. 1.

FIGS. 1 and 2 illustrate the simplicity of assembly of modular furniture when joints according to the invention are employed. It can be seen that no screws, nails or clips encumber the construction or detract from the appearance of the table 10 of FIG. 1, which is formed by the interfitting of the various parts shown in FIG. 2.

As illustrated in FIGS. 1 and 2, a piece of furniture such as the table 10 can be formed of a horizontal plane surface, in this case the table top 11, side elements in the form of rails 12, and supporting legs 13 at each corner.

Comparison of FIGS. 1 and 2 reveals that the individual elements 11–13 are all adapted to be interfitted. Thus the table top 11 has curved recesses 14 at its corners to receive the legs 13, and the rails 12 have longitudinal grooves 15 for reception of the edges of the top 11. The present invention, as will appear in more detail in the discussion of other figures of the drawing, is primarily concerned with the manner in which the supporting elements (here the legs 13) are joined to perpendiculrly extending members such as the rails 12. The term "rails" as used throughout this application refers to elongated structural members, usually serving as parts of the structural frames of furniture.

FIGS. 1 and 2 show that ends 21 of the rails 12 are formed with a dovetail configuration by the provision of an upper notch 22 and a lower notch 23, the slanted surfaces of which are directed inwardly. The notches 22 and 23 cooperate with mating surfaces of upper and lower cap members 24 and 25 respectively above and below the end 21 of the rail to clamp the rails 12 to the legs 13.

Reference is now made to FIG. 3, showing the manner in which the table top 11 is received in the grooves 15 of the rails 12 in the table assembly of FIGS. 1 and 2. It will be seen that the table top 11 is so located, or otherwise adapted, so as not to interfere with either the upper cap member 24 or the lower cap member 25.

The assembly of a typical point in accordance with a preferred embodiment of the invention is illustrated in detail in FIGS. 4–7. Reference numerals employed in drawing, but it should be understood that the joint of the invention and its modifications to be described subsequently have a wide range of applications beyond the type of construction illustrated by the table of FIGS. 1–3 which has been shown as an example of one simple application of the invention.

In the embodiment of FIGS. 4–7, a post 26 is seen to be generally cylindrical in shape, and, if not tubular, has an axial cylindrical hole 27 at least at its upper end 28. A threaded rod 29 is shown to be of a smaller diameter than the post 26 for reception within the axial hole 27 in a manner to be described. A lower cap member 25 has a threaded axial bore 31 sized to fit over the rod 29. The cap member 25 is generally disc-shaped and its lower face can be flat, whereas the upper face of the member 25 has an annular surface 32 that slants downwardly and inwardly from the periphery of the member 25 toward a cylindrical wall 33 surrounding the central bore 31.

The outer circumference of the wall 33 corresponds generally to the inner circumference of a hollow cylindrical sleeve 35 for the reception of the wall 33 within the sleeve 35. The outer circumference of the sleeve's curved surface corresponds to the circumference of the post 26 as shown, thus to appear to be an extension of the post itself. The upper cap member 24 can be generally similar to the member 25 except that its top surface 36 is preferably smooth and uninterrupted.

A foot element 37 having a flat disc-shaped base 38, an upstanding threaded stud 39, and a cooperating fitting 41 with a flat base 42 and an internally threaded tubular stem 43 for press-fitting within the post 26 and threadedly receiving the stud 39 are shown at the bottom of FIG. 4. FIG. 5 shows the foot element 37 and fitting 41 assembled with the post 26.

FIG. 5 also shows the lower cap element 25 seated in position atop the upper end 28 of the post 26 with a portion of the rod 29 extending through its central bore 31.

The next step in the assembly of this embodiment of the joint according to the invention is the fitting of the sleeve 35 about the rod 29 and the cylindrical wall 33 of the member 25 as shown in FIG. 6. FIG. 6 also shows the end 21 of a rail 12 with its upper and lower notches 22 and 23 ready for attachment. It will be noted that there is a vertical groove 44 in the end face 45 of the rail 12, and that the sleeve 35 has a plurality of vertical ribs or splines 46, one of which, indicated at 46a, is aligned with the groove 44 for reception therewithin, as shown in FIG. 7. Preferably the end face 45 of the rail 12 and the vertical faces of the notches 22 and 23 are curved to mate with the curvature of the sleeve 34 and of the cap members 24 and 25 as shown in FIGS. 6 and 7. The transversely extending surfaces of the notches 22 and 23, that is, both the vertical surfaces, and the upwardly and downwardly facing surfaces, which contact curved or conically slanted surface portions of the cap members 24 and 25, are themselves curved and conically formed to rest snugly against the mating surfaces of the cap members 24 and 25, to thus provide firm contact of the abutting surfaces. It will be noted that, when the upper cap member 24 is positioned atop the rod 29 with the dovetailed end 21 between it and the lower cap member 25, the joint formed has an attractive, finished appearance. It will be understood that the sleeve 35 has length slightly less than the height of the rail so that the cap member can be tightened down to compress and wedge the rail end 21 in place.

Figure 8:
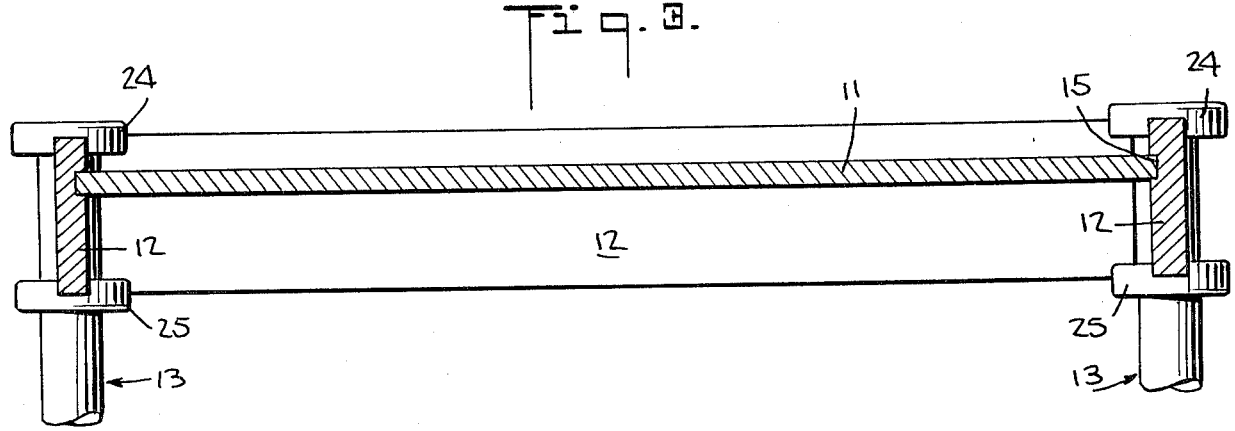
FIG. 8 shows one embodiment of a joint according to the invention in section.
Figures 8, 9, 10:
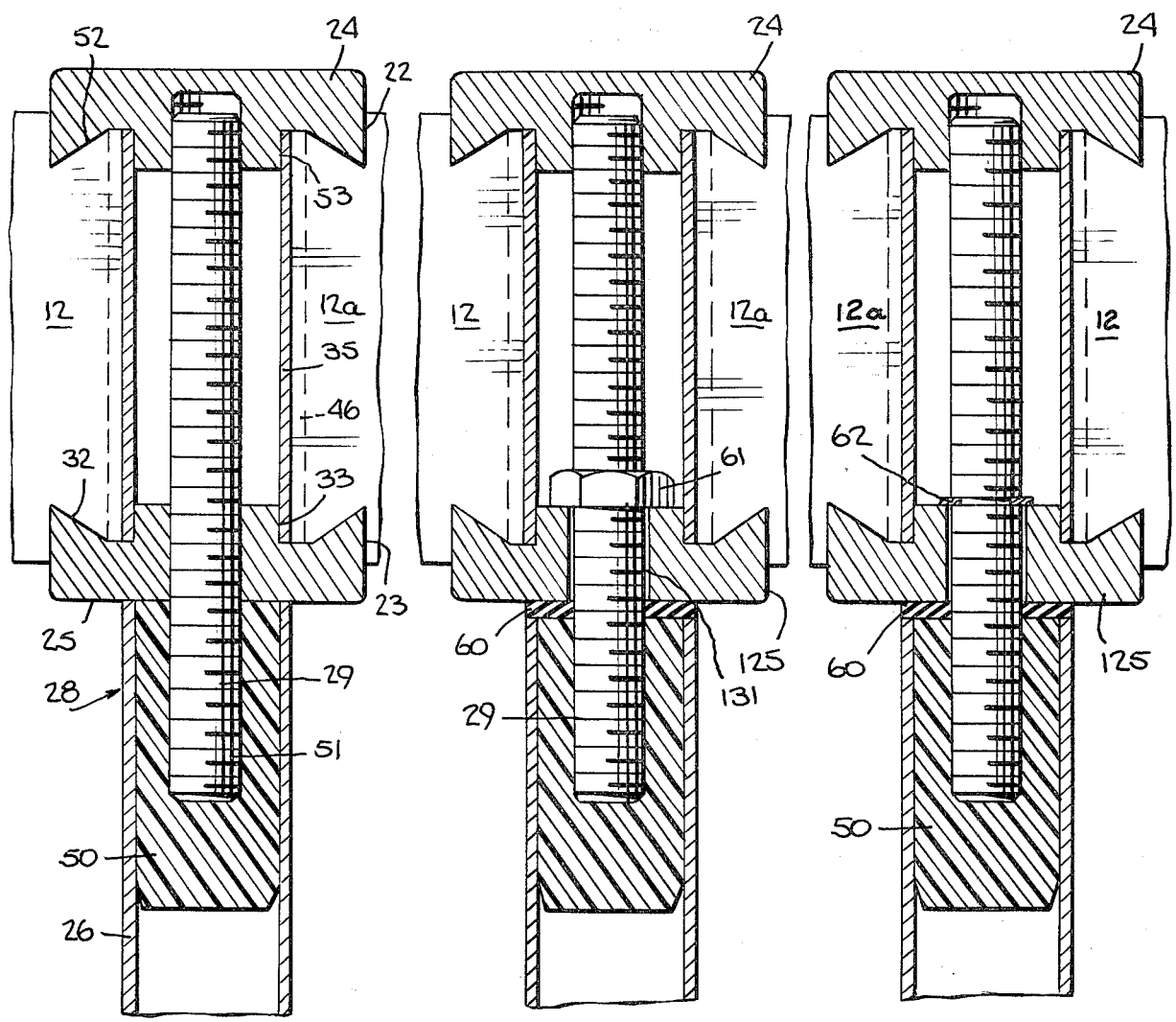
FIG. 9 is a view in section similar to that of FIG. 8 of a modified embodiment of the joint of the invention.
FIG. 10 is a sectional view similar to those of FIGS. 8 and 9 and showing another modified embodiment of the joint of the invention.

The sectional views of FIGS. 8, 9 and 10 illustrate three embodiments of the joint generally illustrated in the foregoing FIGS. 1–7. Each of these three embodiments has its own advantages in particular applications depending on the type of structure in which the joint is employed. In the embodiments of FIGS. 8–10 the upper end 28 of a post 26 is shown as tubular. A cylindrical plug 50, tightly fitted within the tubular end 28, holds the lower end 51 of the rod 29, which extends axially upward from the post 26. Of course a solid post with an axial hole could be used instead of the tubular post and plug shown, but the weight and cost of materials would be increased.

In the embodiment of FIG. 8 both the upper end lower cap members 24 and 25 are threaded on threads of the rod 29. The ends of two rail members 12 and 12a are shown to be clamped into place between the inwardly and downwardly slanted annular surface 32 of the lower cap member 25 and an inwardly and upwardly slanted annular surface 52 of the upper cap member 24. A cylindrical wall 53 of the upper member 24 is similar to the wall 33 of the member 25. Thus when the upper member 24 is screwed down on the threads of the rod 29 the notches 22 and 23 of the ends 21 and 21a of the rails 12 and 12a are guided inwardly toward and against the sleeve 35. The ribs 46 as shown in dashed lines are received in the corresponding grooves 44 and prevent tilting of the rails 12, 12a in the side direction, thus providing a rigid joint.

The embodiment of FIG. 9 is basically similar to that of FIG. 8, except that the lower cap member 125 of FIG. 9 has a cental bore 131 somewhat larger in diameter than the rod 29 which is loosely received rather than threaded therein. A gasket 60 of rubber or similar resilient material is seated between the plug 50 and the member 125 and a nut 61 is threaded on to the rod 29 directly above the cap member 125 for tightening the latter in place. The upper cap member 24 is threaded on to the upper end of the rod 29, and the resilient gasket assures maintaining of a tight-fitting but floating engagement of he rail ends 12 and 12a between the cap members. That is, the inclusion of the resilient gasket 60 between the nut 61 and the plug 50 permits the lower cap member 125 to float, compensating for vertical expansion or contraction of the wooden rails 12, 12a, thus always to maintain a tight joint. The nut 61 may be held in place by application of a plastic thread sealer, or by a lock-nut (not shown).

The embodiment of FIG. 10 is similar to that of FIG. 9 except that, instead of the nut 61, a snap ring 62 acts as a positive fastener for securing the lower cap member 125, while the gasket 60 allows the floating response of the lower cap member 125, between the fixed ring 62 and plug 50, to swelling or shrinkage of joint elements. In the embodiments of both FIGS. 9 and 10, the gasket 60 can be pre-loaded by securing the nut 61 or snap ring 26 on the rod 29 before shipment and then, upon assembly of the joint, merely turning the upper cap member to secure the ends of the joined rails in place.

Figures 11, 12:
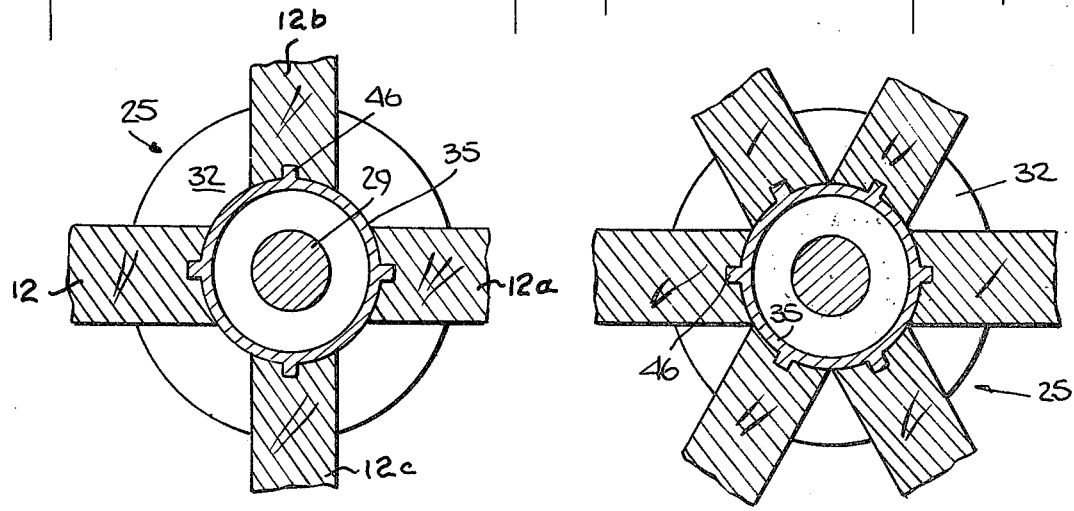
FIG. 11 is a sectional view from above of an assembly of a post with four rails joined in accordance with the invention.
FIG. 12 is a view similar to that of FIG. 11 but showing six rails joined to a post.

FIG. 11 is a plan view illustrating the joining of four rails 12, 12a, 12b and 12c extending radially from the same post at 90° circumferential spacings. The sleeve 35 in FIG. 11 has four ribs or splines 46 respectively for holding the four rails 12–12c in alignment. The curved end faces of the rails are seen to mate with the curved outer surface of the sleeve.

FIG. 12 shows a sleeve 35 with six equally arcuately spaced vertical ribs 46 forming a joint with six rails at angles of 60°.

It will be appreciated that a sleeve 36 having the desired number and orientation of ribs 46 for any relative placement of rails extending perpendicular to, and within the plane of, a post, can be selected for a given assembly.

Figure 13:
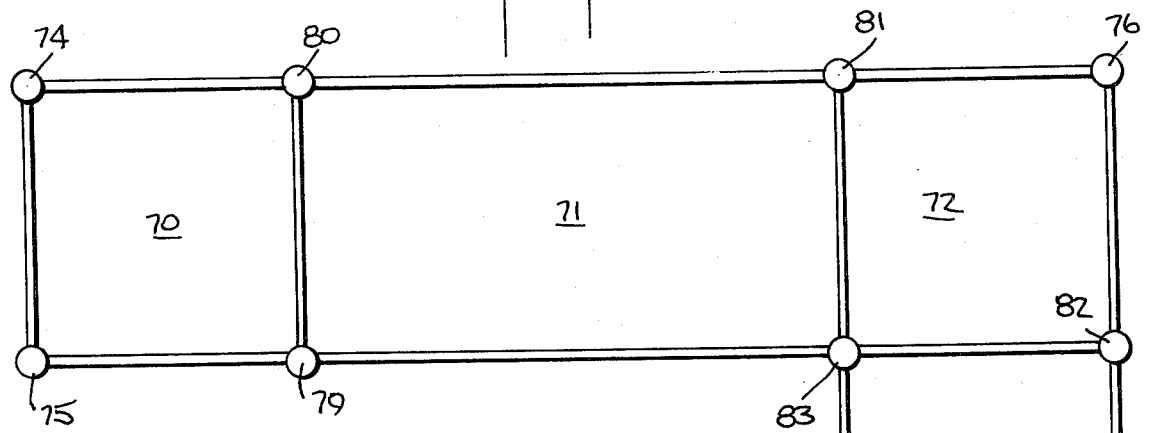
FIG. 13 is a plan view of a modulator furniture arrangement constructed in accordance with the invention.

Thus in the plan view of FIG. 13, wherein horizontal surfaces 70, 71, 72 and 73 could represent a table top, a cushioned seat, another table top, and a planter respectively, certain of the joints, as at 74–78, support two rails, while others at 79–82 support three rails, and the joint 83 supports four rails.

Figure 15:
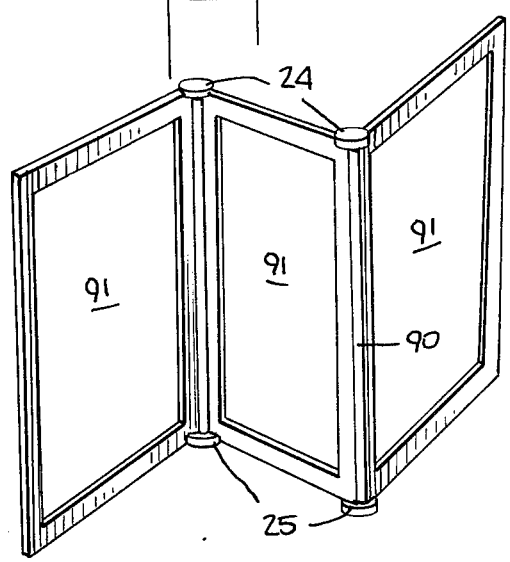
FIG. 15 is a view in perspective of a free-standing partition arrangement embodying joint assemblies of the invention.
Figure 14:
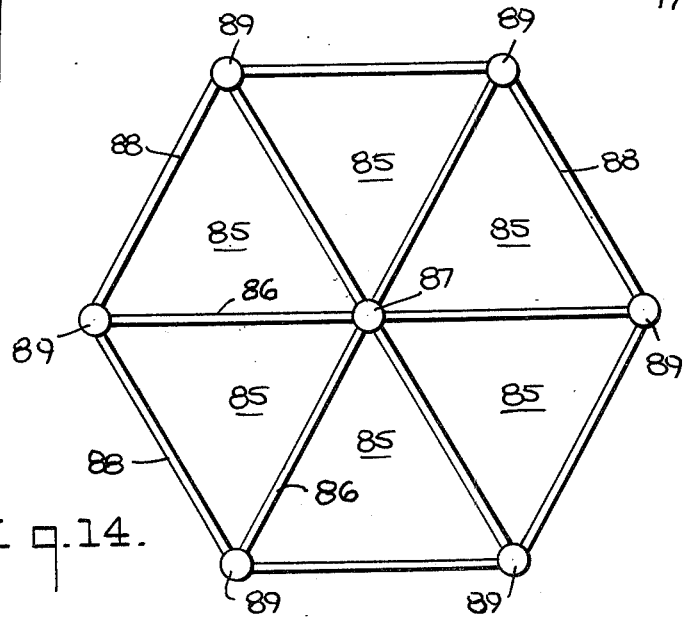
FIG. 14 shows, in plan view, another modular furniture arrangement constructed in accordance with the invention.

FIG. 14 shows a plurality of equilateral triangular panels 85 supported by rails 86 extending radially from a central post 87 and supported at their outer sides by rails 88 extending between posts 89 to form a hexagonal chair frame or table. In the free-standing partition assembly of FIG. 15, upper and lower cap members 24 and 25 are widely spaced, at the ends of a sleeve 90 of extended length substantially equal ot the height of the partition, to clamp from above and below a plurality of panels 21, having suitable notches at their tops and bottoms for interfitting with the cap members in the manner described with respect to FIGS. 4–7. If ribs 46 are omitted in the arrangement of FIG. 15, the relative angular relationship of the panels 91 can be changed as desired, by simply loosening the caps and retightening them after the panels 91 have been repositioned.

It will be understood that numerous other arrangements of structural members can be constructed by using joints according to the invention. For example, more than one pair of cap members 24, 25 could be vertically aligned to join rails at different vertical positions to the same post. In the embodiments illustrated the joints are formed between vertical posts and a horizontal rail, but the members joined need not be so oriented and joints according to the invention can be provided between any two relatively perpendicular members.

The choice of materials for the various elements shown in wide, and various combinations of materials will suggest themselves to those acquainted with the art. Thus the rails can be of wood and the cap members, rods and sleeves can be of metal such an aluminum or steel, or suitable synthetic plastics could be employed for the various members. The post 26, shown as a solid walled tube, could, for economy and light weight, be formed with interior and exterior walls joined by radial webs, if desired, or extruded.

These and other modifications and adaptations of the joint of the invention and assemblies incorporating such joints are considered to be within the spirit and scope of the invention.

What is claimed is:

1. A furniture joint between a vertical furniture post and the ends of a plurality of elongated horizontally extending furniture structural members, the upper end of said post being cylindrical, a rod concentrically mounted in said upper end of said post and extending upwardly to terminate in a threaded upper end, two spaced opposedly positioned cap-like members concentrically mounted on said rod for clampingly receiving the ends of said horizontal structural members therebetween by screwing said upper cap-like member down on the threads of said rod, said cap-like members each haivng a diameter larger than that of said upper end of said post, a cylindrical sleeve on said rod and extending between said cap-like members when the latter are in their said clamping relation with said structural members, annular peripheral portions of said cap-like members outwardly of said sleeve slanting outwardly toward each other, and generally triangular notches at the upper and lower portions of the ends of said horizontal structural members interfitting with said slanting portions of said cap-like members in dovetail fashion when said cap-like members are in their said clamping relation with said structural members, said lower cap-like member being slidably fitted on said rod, a resilient member between the upper end of said post and said lower cap-like member for accommodating dimensional changes of assembled members, and means directly above said lower cap-like member for positively securing said lower cap-like member in place on said rod, and for pre-loading said resilient member.

2. In modular furniture construction of the type wherein a plurality of upright furniture posts support furniture rail members extending laterally between the posts, the improvement comprising means joining the respective ends of each said rail member between respective pairs of said posts, each of the ends of said rail members having a dovetail configuration provided by upper and lower notches adjacent to the end, each said post carrying an axially aligned upwardly projecting rod whose diameter is less than the lateral dimension of the post and a pair of vertically spaced apart cap-like members mounted on each of said post rod, said cap-like members having a lateral dimension larger than that of their said associated posts and further having convergingly directed slanted surfaces adjacent their peripheries for engaging said notches of the rail member ends with which they are associated, a cylindrical sleeve mounted on each said post rod and extending vertically between said pair of cap-like members thereon, each said sleeve having height which is less than that of said ends of said rail members associated with the post on which the sleeve is mounted, the ends of said rail members abutting said sleeves on said posts to which said rail member ends are joined, means for adjusting the relative vertical spacing between each pair of cap-like members for clamping said associated rail member ends therebetween with said slanted surfaces of the pair of cap-like members engaging said dovetail-forming notches of the rail member end with which the pair of cap-like members is associated, at least some of said rail members each having means defining a longitudinally extending groove, a horizontally extending furniture member having edges respectively received said rail member grooves and thereby supported by said rail members, said grooves extending substantially horizontally at a height elevation which is between said upper and lower dovetail-forming notches of the rail member ends, and the upper surface of said horizontally extending member being at an elevation which is below the undersides of said upper cap-like members.

3. The improvement according to claim 2 which further includes means between each said sleeve and each of its said associated rail member ends for retaining each said rail member in upright relation substantially within the vertical plane of said posts between which the rail member extends.

4. The improvement according to claim 3 wherein said means between each said sleeve and each of its said associated rail member ends comprises projection means on one, and comating projection-receiving groove means on the other of each associated sleeve and rail member end.

* * * * *

UNITED STATES PATENT AND TRADEMARK OFFICE
CERTIFICATE OF CORRECTION

PATENT NO. : 3,986,316
DATED : October 19, 1976
INVENTOR(S) : Leif Blodee

It is certified that error appears in the above-identified patent and that said Letters Patent are hereby corrected as shown below:

Column 3, line 54, after "typical" correct spelling of --joint--.

Column 3, line 57, before first word "drawing" insert:

--Figs. 1 - 3 are employed in these and other figures of the --

Column 5, line 3, change last word "end" to --and--

Column 5, line 60, change numeral "36" to --35--

Signed and Sealed this

Twenty-eighth Day of December 1976

[SEAL]

Attest:

RUTH C. MASON
*Attesting Officer*

C. MARSHALL DANN
*Commissioner of Patents and Trademarks*